No. 691,406. Patented Jan. 21, 1902.
L. H. MORGAN.
STUD SETTING AND EXTRACTING TOOL.
(Application filed Jan. 28, 1901.)
(No Model.)
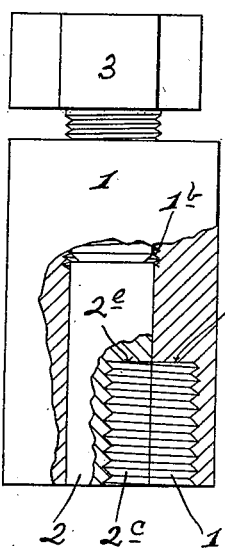
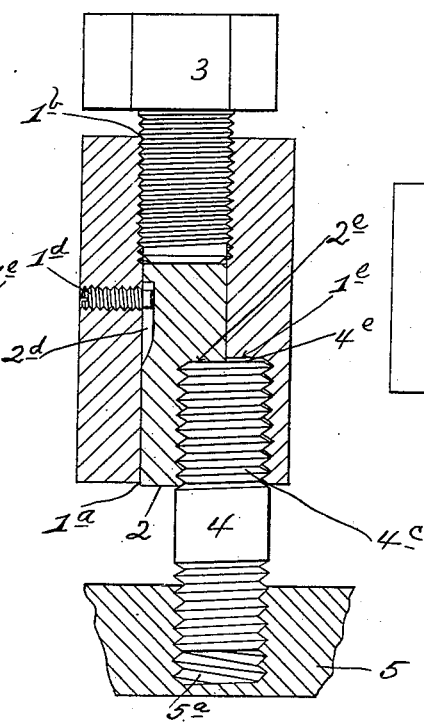
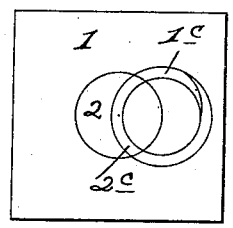
Witnesses
Lewis H. Morgan, Inventor

UNITED STATES PATENT OFFICE.

LEWIS H. MORGAN, OF PLAINFIELD, NEW JERSEY.

STUD SETTING AND EXTRACTING TOOL.

SPECIFICATION forming part of Letters Patent No. 691,406, dated January 21, 1902.

Application filed January 28, 1901. Serial No. 45,087. (No model.)

*To all whom it may concern:*

Be it known that I, LEWIS H. MORGAN, a citizen of the United States of America, residing in Plainfield, Union county, State of New Jersey, have invented certain new and useful Improvements in Stud Setting and Extracting Tools, of which the following is a specification.

My invention relates, broadly, to split screws or nuts, one part being rigidly held to the supporting-body and the other part being movable longitudinally of the rigidly-held portion; to means for actuating said movable part longitudinally of the body independently of said rigid part to clamp a screw-threaded piece of work or stud to said body with more or less pressure, according to the work to be done, and to other details of improvements and combinations of parts hereinafter described and then pointed out in the claims.

Reference is to be had to the accompanying drawings, forming part hereof, wherein—

Figure 1 is a vertical cross-section of a device embodying my invention, the parts being shown in the stud-extracting position. Fig. 2 shows the parts in the stud-setting position, and Fig. 3 is a bottom plan view of Fig. 2.

Similar numerals of reference indicate corresponding parts in the several views.

1 is a body having a bore shown smooth at one end to receive a half-nut 2, that is movable longitudinally of the body 1 and held from rotation independently of body 1 by any suitable means, such as a groove $2^c$ and a screw $1^c$. The other end $1^b$ of said body-bore is shown screw-threaded to mesh with a jam-screw 3, the end thereof being adapted to engage the end of the half-nut 2 to actuate said half-nut 2 longitudinally of the body 1. When the parts are in the position shown in Fig. 2, the body 1 and half-nut 2 are then preferably drilled and tapped with screw-threads $1^e 2^e$ to mesh with the screw-threads $4^c$ of a stud 4. This construction thus provides a split nut $2^c 1^c$, one portion $1^c$ of which is rigidly connected with body 1 and the other portion $2^c$ of which is movable longitudinally independently of its correspondingly-threaded portion $1^c$.

Other means for actuating part 2 longitudinally of body 1 and independently of part $2^c$ may of course be used; but I have selected the jam-screw 3 as being the simplest and most effective. To increase the relative pressure of jam-screw 3 and the threads $1^c 2^c 4^c$, I have preferably shown the screw-threads of said jam-screw of finer pitch than those of the stud 4.

The operation of the parts is as follows: The parts being in the relative positions illustrated in Fig. 2, a stud 4 can be set in a tapped hole $5^a$ in work 5 in the usual manner by the friction of its end $4^e$ engaging the end surfaces $1^e 2^e$ of the split nuts $1^c 2^c$; but should the stud 4 refuse to go down to the required depth in hole $5^a$ (see Fig. 1) after the operator has tried every means in his power to complete the proper setting he will then be unable to get the stud out without destroying it and probably redrilling and retapping the hole to make room for a new properly-fitting stud. With the device herein illustrated and described the operator can increase the frictional grip of the screw-threads $1^c 2^c 4^c$ by tightening the jam-screw 3, which will move the half-nut 2 longitudinally of body 1 independently of half-nut $1^c$, and thereby create sufficient friction of the threads $1^c 2^c 4^c$ to insure the backing out of the stud without injury to the stud or the work, and thereby avoiding the time and expense wasted by the usual inability to back the stud out without destroying it.

Having now described my invention, what I claim is—

1. A body having a rigidly-carried internally-screw-threaded portion, and a longitudinally-movable internally-screw-threaded portion, said screw-threaded portions being adapted to coact to mesh with a stud, and means carried by the body to actuate said movable screw-threaded portion longitudinally of the body independently of said rigidly-carried screw-threaded portion, substantially as described.

2. A body having a rigidly-carried internally-screw-threaded portion and a longitudinally-movable internally-screw-threaded portion, said screw-threaded portions being adapted to coact to mesh with a stud, and a jam-screw carried by the body in line with and adapted to actuate said movable internally-screw-threaded portion, substantially as described.

LEWIS H. MORGAN.

Witnesses:
ANDREW VANDERBECK,
JOSEPH SATTELS.